Patented May 3, 1932

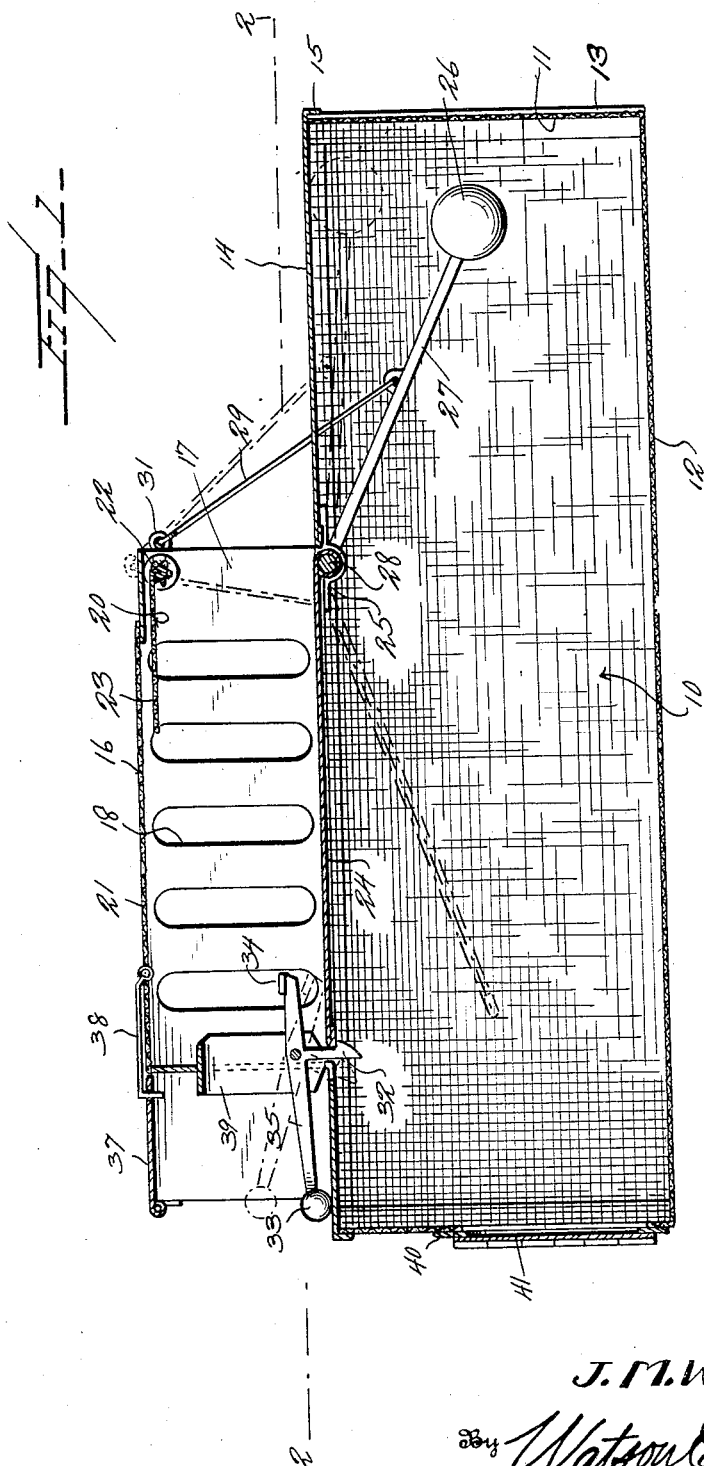

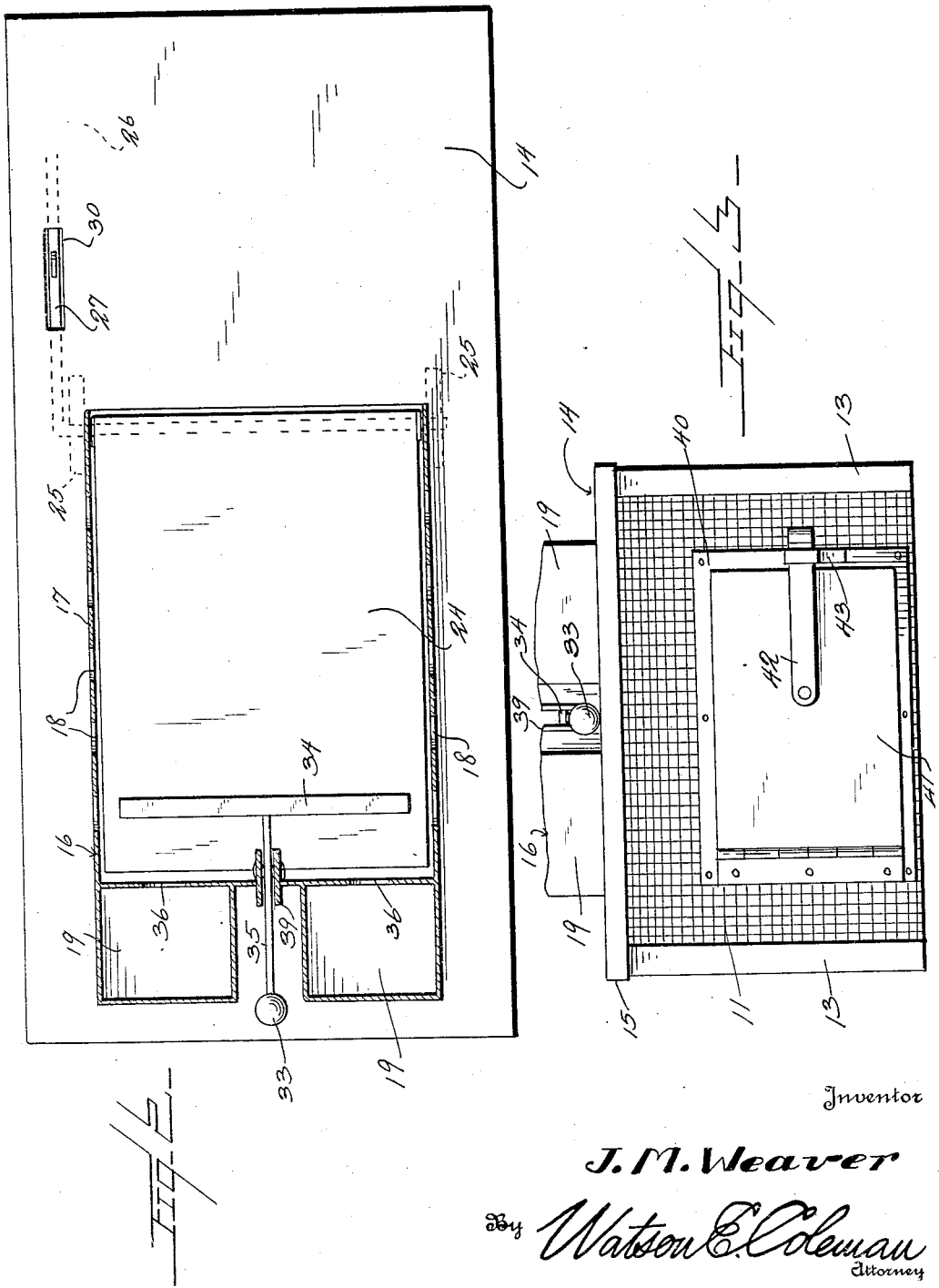

1,856,980

UNITED STATES PATENT OFFICE

JERRY M. WEAVER, OF HOPKINSVILLE, KENTUCKY, ASSIGNOR OF ONE-HALF TO JAMES ELMER COLEMAN, OF ALLENSVILLE, KENTUCKY

RAT OR MOUSE TRAP

Application filed June 20, 1931. Serial No. 545,736.

This invention relates to traps, and more particularly to traps adapted for catching of rodents or the like.

An object of this invention is to provide a trap of this kind which is so constructed as to catch the rodents alive, the trap including means whereby the rodent cannot get out of the trap after the trap door has been sprung.

Another object of this invention is to provide a novel trap door tripping means by which the trap door is released and simultaneously the entrance to the trap is closed so that the rodent cannot back out of the trap.

A further object of this invention is to provide a novel food reservoir or chamber which is adapted to receive various kinds of food which cannot be readily removed therefrom by rodents entering the tripping chamber of the device.

The above and various other objects and advantages of this invention will in part be described in and in part be understood from the following detailed description of the present preferred embodiment, the same being illustrated in the accompanying drawings, wherein:—

Figure 1 is a longitudinal section taken substantially through the longitudinal center of a device constructed according to the preferred embodiment of this invention;

Figure 2 is a sectional view partly in detail taken on the line 2—2 of Figure 1, and Figure 3 is a fragmentary end elevation of the device.

Referring to the drawings wherein like numerals of reference designate corresponding parts throughout the several views, the numeral 10 designates generally a cage or closure which may be constructed of any desired material, such as woven wire 11, which is held together by means of corner posts 13, the closure or cage 10 having a bottom 12 constructed of material similar to the material of the sides and end walls. These end posts 13 may be constructed of angle iron or metal to which the side and end walls are attached so as to provide a closed structure.

A top wall 14 is mounted on the cage structure 10, this top wall 14, in the present construction, being made of a sheet of metal having depending marginal edge portions 15 to which the wire 11 is attached. A trap chamber, generally designated as 16, is mounted on the top wall 14, this trap chamber 16 being relatively smaller in size than the cage 10 and having side walls 17 which are provided with apertured portions 18. These side walls 17 terminate at one end in bait chambers 19 which may be constructed integrally with the side walls 17 and at one end thereof. The opposite end of the trap chamber 16 is open and a hinged closure, generally designated as 20 is adapted to close the forward or front end of the trap chamber 16, as will be hereinafter described. The top wall of the trap chamber 16 is provided with wire mesh 21 or the like but I, of course, do not wish to be limited to this particular construction as the top wall 21 may be constructed of other material, if desired.

The closure 20 comprises a shaft 22 which is swingably mounted in the side walls 17 and has a closure structure 23 in the form of wire mesh or the like secured thereto, this closure 23 being adapted to close the opening in the front of the trap chamber 21. A trap door 24 is pivoted, as at 25, to the top wall 14 adjacent the open end of the trap chamber 16, this trap door 24 being constructed of relatively smooth material which is preferably similar to the material of the top wall 14.

A weight 26 is mounted on a rod or stem 27 which is integrally formed with the pintle or shaft 28 of the trap door 24, and is adapted to gravitatingly urge the trap door 24 upwardly into closed position. A connecting link 29 extends through a slot 30 in the top wall 14, this connecting link 29 being connected at one end to the rod or stem 27 and at the opposite end to an eye 31 carried by the closure shaft 22. In this manner, the vertical movement of the weight 26 will move the trap closure member 23 into either open or closed position.

A weighted latch member 32 is rockably disposed between the bait chambers 19 and is adapted to engage the free end of the trap door 24, so as to hold this trap door in closed position. The weight 33 of the latch member 32 is adapted to gravitatingly swing the latch member 32 into engagement with the free end of the door. A latch releasing bar 34 is disposed above the trap door 24 and connected by means of a connecting bar 35 to the latch member 32. Normally, this releasing or tripping bar 34 is disposed upwardly or in spaced relation to the upper surface of the trap door, but upon the application of a slight weight to this tripping bar 34, the bar will swing downwardly toward the trap door and coactively swing the latch member 32 out of engagement with the free end of the trap door 24 and permit the trap door to drop downwardly and cause the rodent to enter the cage 10. The bait chambers 19 are provided with apertures 36 in the inner walls thereof so that the rodent entering the trap chamber 16 can readily see the bait and grasp a portion of the bait. A lid 37 is disposed across the top of the trap chamber 16 and engages over the upper open ends of the bait chambers 19, so as to close these chambers.

A securing hook or member 38 is pivotally carried by the top wall 21 of the trap chamber and engages the bait closure member 37 so as to hold this closure in closed position. The weight 33 of the latch 32 extends through a tubular casing 39, which is disposed between the two bait chambers 19, this tubular member 39 being substantially elliptical in cross section, so as to permit the vertical movement of the weight member 33 and the means connecting the weight member with the latch 32. A frame 40 is mounted in one end wall of the cage 10 and has a door or closure member 41 hingedly secured thereto, which is provided with a pivoted latch or locking member 42 engaging a keeper 43.

In the operation of this device, the desired bait is mounted in the bait chambers 19 so that a portion of the bait will be disposed through the openings 36 on the inner wall of the bait chambers and the trap door 24 is in substantially horizontal closed position, being held in this position by means of the latch 32. The door or closure 20 will be maintained in open position when the trap is in closed position by means of the link 29, so as to permit the rodents to walk on the upper surface of the top wall 14 and enter the trap chamber 16. In order for the rodent to remove any of the bait in the chamber 19, it is necessary for it to contact with the tripping bar 34 and this bar is so disposed that the rodent will place its front feet on this bar and attempt to remove the bait through the bait window opening 36. The application of a slight weight on the tripping bar 34 will rock the latch 32 out of engagement with the free end of the trap door 24 and permit the trap door to drop downwardly into the cage 10, so that the rodent will slide into this cage 10 and simultaneously with the downward swinging of the trap door, the entrance to the trap chamber 26 will be closed by downward swinging of the trap chamber door 20 which is connected to the trap door structure 24 by means of the link 29. Any rodents caught in the cage 10 may be readily removed therefrom by swinging the door 41 into open position.

It is, of course, understood that various changes and modifications may be made in the details of construction and design of the above specifically described embodiment of this invention without departing from the spirit thereof, such changes and modifications being restricted only by the scope of the following claims.

I claim:—

1. A trap of the character described comprising a cage, a trap door pivotally carried by the top of the cage, means for constantly urging the door into closed position, a releasable latch engaging the door for holding the door in closed position, a tripping bar carried by the latch disposed transversely of the door whereby to swing the latch into released position upon depression of the bar, a housing disposed about the trap door and having one end thereof open, a closure for closing the open end of the housing, and connecting means connecting the closure with the means for holding the trap door in closed position whereby to swing said closure into open position upon closing of the trap door and coactively swing said closure into closed position upon depression of the trap door.

2. In a trap including a cage, a trap door pivotally carried by the cage, a weight secured to the door for holding the door in closed position, releasable locking means for holding the door in closed position, a housing disposed about the door and having one end thereof open, a vertically rockable closure for the open end of the housing, connecting means connecting the closure with the weight whereby to normally hold said closure in open position upon closing of the trap door, said closure swinging downwardly into closed position upon downward swinging movement of said door, and means for holding bait at one end of the housing.

3. In a trap, a vertically swingable trap door carried by the top of the trap, a weight for gravitatingly holding the door in normally closed position, a latch engaging one end of the door for locking the door in closed position, a tripping bar disposed above the door and transversely thereof and connected to said latch whereby to swing said latch into released position upon depression of the bar, a housing disposed about the door, a vertically swingable closure for one end of the housing, connecting means connecting the closure with the weight for holding said closure in normally open position, a bait holding chamber disposed at the opposite end of the housing and having an opening through one wall thereof communicating with the housing, and a lid for closing the open upper end of said compartment.

4. A trap of the character described comprising a cage, a trap door swingably mounted in the top of the cage, a housing disposed about the trap door, a weight secured to the door and gravitatingly maintaining the door in closed position, a pivoted latch engaging the door for locking the door in closed position, a weight secured to the latch for holding the latch in locking position, a releasing bar carried by the latch and disposed above the door and transversely thereof, a pair of bait compartments having open upper end portions and openings in one wall thereof communicating with the interior of the housing, a normally open closure for one end of the housing, and means connecting said closure with the weight whereby to hold said closure in normally open position, said closure upon depression of said bar and downward swinging of the trap door swinging downwardly into closed position whereby to prevent release of an animal positioned within the housing.

In testimony whereof I hereunto affix my signature.

JERRY M. WEAVER.